E. NAETHER.
ELECTRIC CURRENT CONTROLLER.
APPLICATION FILED APR. 4, 1921.
1,418,726.
Patented June 6, 1922.
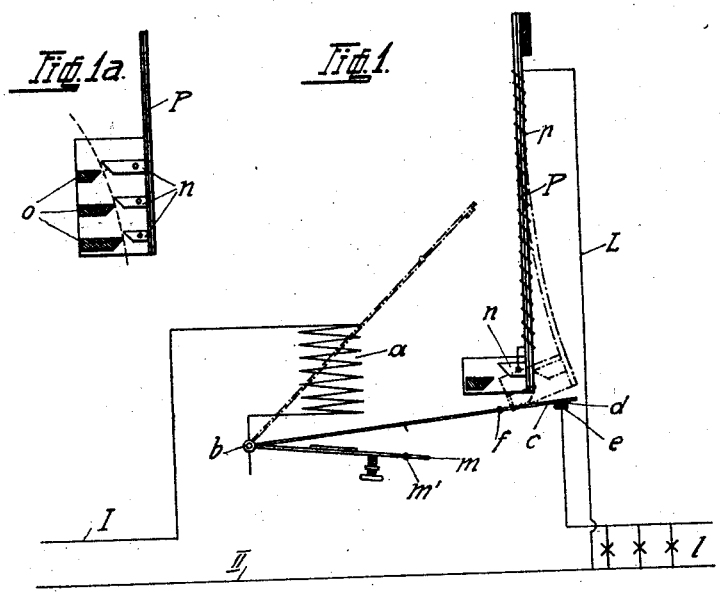
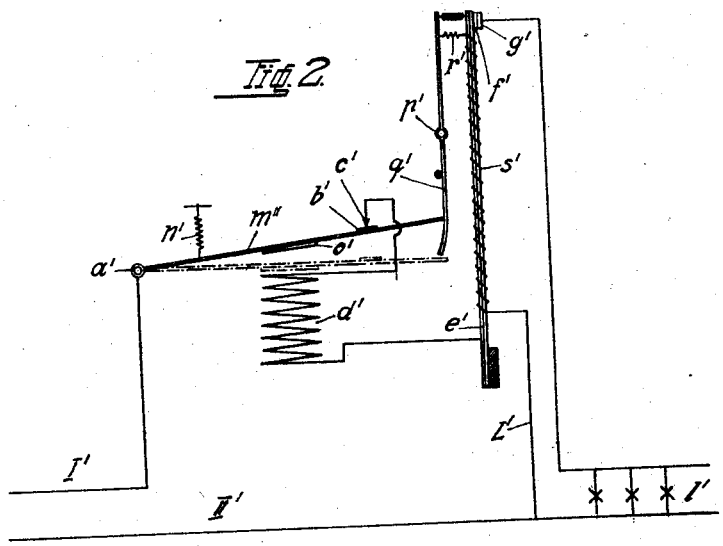
ERNEST NAETHER
INVENTOR;

UNITED STATES PATENT OFFICE.

ERNEST NAETHER, OF VEVEY, SWITZERLAND.

ELECTRIC-CURRENT CONTROLLER.

1,418,726.   Specification of Letters Patent.   Patented June 6, 1922.

Application filed April 4, 1921. Serial No. 458,462.

*To all whom it may concern:*

Be it known that I, ERNEST NAETHER, a citizen of the Swiss Confederation, and residing at Vevey, Switzerland, have invented certain new and useful Improvements in Electric-Current Controllers, of which the following is a specification.

The present invention has reference to certain new and useful improvements in apparatus for controlling the amount of metered electric current passing through a system operating on bulk tariff, and it relates more particularly to current limiting apparatus which will keep the amount of current metered out within the maximum allowed under the agreed upon bulk tariff; which will immediately interrupt the current supply when an attempt is made to abstract current beyond the predetermined amount, and which will, after a certain period of non-supply, automatically restore the resumption of the current supply, and repeat this cutting-out and cutting-in again of the current until the overload is removed and normal current consumption is again restored.

The subject of the invention is a device of the type and for the purposes indicated which, on overload, that is to say when an attempt is made to abstract from the system more current than is contracted for, will periodically interrupt the main current circuit in such manner that periods of relative long duration, depending upon the time required for the heating and cooling of an electrically operated cut-in thermostat, alternate with instantaneous closures of the main circuit. Such a current controller operates far more satisfactorily than most of the devices now in use, in which for instance the cutting-out and in again is caused to recur too rapidly, so that an effective control of the excess current is not possible, and in which also there is the danger on heavy overload of the contacts and coils being burned-out. In other proposed devices the cut-out once operated by the overload must be restored again to its "in" position by hand, which obviously is troublesome for various reasons; in still another type of controllers on the market a thermostat automatically restores the tripped cut-out to the "in" position after a certain period, but with the drawback that the arresting device operated by the thermostat remains inactive after having once functioned until the thermostat has completely cooled down. During this enforced period of inactivity the controller is liable to burn-out under a heavy overload, as in the case of an ordinary controller without arresting device.

The construction and operation of my new controller, which effectively obviates all these drawbacks, will best be understood when described in connection with the accompanying drawing, in which Fig. 1 is a diagrammatic view of the device with the wire connections; Fig. 1ª shows a detail of a multiple contact arrangement, and Fig. 2 is a diagram of a modification.

Referring first to Fig. 1, the current flows through the main I, through the electromagnetic coil $a$, the contact arm $c$ which is fulcrumed at $b$, the contacts $d$ and $e$, to the point of consumption, for instance the lamps $l$, and back through main II.

If the current exceeds a certain predetermined limit the coil $a$ will attract the armature $m$, also fulcrumed at $b$, its enlargement $m'$ forcibly striking the arm $c$ so that the latter is thrown upwardly into the dotted line position, which interrupts the current between the points $d$ and $e$. On dropping back the arm $c$ is intercepted by the metallic hinged contact member $n$ of the thermostat P when a secondary circuit is established through the thermostat, the current now passing through arm $c$, the hinged contact $n$, the heating winding $p$ and the line wire L to the main II. The inner lateral face of the contact member $n$ is beveled and in the path of the upward movement of the arm $c$, and as the arm $c$ moves upwardly it strikes the beveled face of the member $n$ and pushes aside the thermostat P which is sufficiently flexible to yield under the pressure of the nose or pin $f$ projecting from arm $f$ substantially at a right angle to the latter. The thermostat is composed of two metals having different coefficients of expansion and when heated will be flexed toward the right, as shown in the dotted line position, when the contact $n$ will be gradually be withdrawn from under the contact nose $f$ of the arm $c$, the nose $f$ then dropping onto the insulated stop member $o$, which is also rigidly supported from the lower end of the thermostat body in spaced relation to the contact $n$.

The secondary circuit is now interrupted. The thermostat presently cools-off and gradually returns into the normal, full line, position which enables the nose $f$ to slip off its rest $o$ through the space between the latter and the contact $n$, so that now the contact arm $c$ can drop back into its initial position with the contacts $d$ and $e$ closing the main circuit again, the device then resuming the supply of normal current to the point of consumption. In case the overload conditions still obtain the armature $m$ will again be attracted by its coil $a$ and the just described operations are repeated.

For extending the duration of the interruptions in the supply of current a plurality of such hinged contact members $n$ and corresponding insulated stop members $o$ can be provided, as shown in Fig. 1a.

In Fig. 2 a constructional modification is shown, in which the current flows from the one main $1'$ over the fulcrum $a'$, the contacts $b'$ and $c'$, coil $d'$, thermostat body $e'$, contacts $f'$ and $g'$, to the lamps $l'$. On overload the coil $d'$ attracts the contact lever $m''$, fulcrumed at $a'$ and provided with the soft iron armature plate $o'$, which breaks the circuit between the contacts $b'$ and $c'$. In its lowermost position the front end of the contact lever $m''$ is caught beneath the lower end of a rock member $q'$, fulcrumed at $p'$. This rock member $q'$ is influenced by the draw spring $r'$ and is electrically connected to the heating winding $s'$ of the thermostat $e'$. The contact lever $m''$, acted on by the draw spring $n'$, is thus prevented from moving up again although the coil no longer attracts its armature. A secondary circuit is now closed over $a'$, $m''$, $q'$, $r'$, $s'$ and the wire $L'$. Presently the free upper end of the heating-up thermostat will be deflected toward the left, the contacts $f'$ and $g'$ are disconnected, and the rock member $q'$ is rocked about its fulcrum $p'$ until its lower end slides off the contact lever $m''$, which latter is now drawn upward by its spring $n'$ and closes the contact points $b'$ and $c'$. The main current, however, still remains open until the contacts $f'$ and $g'$ cooperate again after the secondary circuit has been interrupted and the thermostat has cooled-off.

The thermostat may be of any suitable construction, not necessarily as shown with heating wire winding; it may for instance be of the membrane or other type.

What I claim is:—

1. Electric current controller, characterised by the feature that on overload the main current is periodically interrupted in such manner that interruptions of relatively long duration, corresponding to the heating and cooling periods of an electrically heatable cut-in thermostat, alternate with instantaneous closures of the main circuit.

2. In an electric current controller of the aforeclaimed character, the feature that the main cut-out on overload is operated by a coil and armature to open the main circuit and is then locked by an arresting device operated by an electrically operated thermostat, until the fully heated thermostat cuts out its own heating element and on cooling causes the cut-out to again complete the main circuit, in such manner that on completion of the main circuit the several operative parts again assume their initial relative position.

3. In an electric current controller of the aforeclaimed character, the feature that the thermostat is provided with at least one electrically conducting hinged contact member and one insulating stop member, for the purpose of arresting the main cut-out during heating and cooling of the thermostat.

4. In an electric current controller of the aforeclaimed character, the feature that there are provided two contact units in the main circuit, of which the one is first openingly operated by the main cut-out and the second one later on by the thermostat.

ERNEST NAETHER.